(12) United States Patent
Cioffi et al.

(10) Patent No.: US 8,310,914 B2
(45) Date of Patent: *Nov. 13, 2012

(54) PHANTOM USE IN DSL SYSTEM

(75) Inventors: John M. Cioffi, Atherton, CA (US); Bin Lee, Mountain View, CA (US); Wonjong Rhee, Palo Alto, CA (US); Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/853,209

(22) Filed: Aug. 9, 2010

(65) Prior Publication Data

US 2011/0051593 A1 Mar. 3, 2011

Related U.S. Application Data

(62) Division of application No. 11/267,623, filed on Nov. 4, 2005, now Pat. No. 7,773,497.

(60) Provisional application No. 60/678,977, filed on May 9, 2005.

(51) Int. Cl.
*H04L 5/20* (2006.01)

(52) U.S. Cl. ....................................... 370/200
(58) Field of Classification Search .................... 370/200
See application file for complete search history.

(56) References Cited

U.S. PATENT DOCUMENTS

| | | | |
|---|---|---|---|
| 5,181,198 A | 1/1993 | Lechleider | |
| 5,511,119 A | 4/1996 | Lechleider | |
| 5,621,768 A | 4/1997 | Lechleider | |
| 5,642,412 A * | 6/1997 | Reymond | 379/348 |
| 5,901,205 A | 5/1999 | Smith et al. | |
| 6,147,963 A * | 11/2000 | Walker et al. | 370/200 |
| 6,507,608 B1 | 1/2003 | Norrell | |

(Continued)

FOREIGN PATENT DOCUMENTS

CN 101461253 6/2009

(Continued)

OTHER PUBLICATIONS

Office Action for Chinese Patent Application No. 200680022004.3, mailed May 27, 2010, 6 pages.

(Continued)

*Primary Examiner* — Alexander Jamal
(74) *Attorney, Agent, or Firm* — Blakely, Sokoloff, Taylor & Zafman

(57) ABSTRACT

Superimposing phantom-mode signals reinforces existing differentially driven DSL downstream signals in a vectored binder of DSLs or reinforces upstream vectored signals in a binder of differentially excited twisted pairs, thus expanding the extra transmission modes of the previous GDSL multi-wire two-sided-excitation invention to the case where coordination can only occur on one-side of the binder. Each pair is treated as a common-mode antenna with respect to earth ground, with some pairs selectively excited at the transformer center tap at the transmit end with respect to a common (earth or chassis) ground reference. Corresponding receivers on other non-excited pairs sense the signals between their center taps and a ground at the opposite ends of the lines to the exciting transmitters. A dual use with hybrid circuits allows the receiving circuit to also have an upstream transmitter and an upstream-sensing receiver on the center tap of the opposite side of an adjacent wire.

20 Claims, 9 Drawing Sheets

U.S. PATENT DOCUMENTS

| | | |
|---|---|---|
| 6,940,973 B1 | 9/2005 | Yeap et al. |
| 2002/0138811 A1 | 9/2002 | Bosley et al. |
| 2003/0086514 A1 | 5/2003 | Ginis et al. |
| 2004/0239443 A1 | 12/2004 | Kottschlag et al. |
| 2005/0053229 A1 | 3/2005 | Tsatsanis et al. |
| 2005/0129218 A1 | 6/2005 | Kimble et al. |
| 2005/0152385 A1 | 7/2005 | Cioffi |
| 2006/0109779 A1 | 5/2006 | Shah et al. |
| 2009/0207985 A1 | 8/2009 | Cioffi et al. |

FOREIGN PATENT DOCUMENTS

| | | |
|---|---|---|
| DE | 4444312 | 2/1996 |
| GB | 2315392 | 1/1998 |
| JP | 2006121459 | 5/2006 |
| WO | WO-95/31867 | 11/1995 |
| WO | WO-01/35611 | 5/2001 |
| WO | WO-03/105339 | 12/2003 |
| WO | WO-2004/027579 | 4/2004 |
| WO | WO 2005/094052 | 10/2005 |
| WO | WO2005094052 | 10/2005 |
| WO | WO2005114861 | 12/2005 |
| WO | WO2005114924 | 12/2005 |

OTHER PUBLICATIONS

Notice of Allowance for U.S. Appl. No. 11/267,623, mailed Mar. 26, 2010, 6 pages.

Office Action for U.S. Appl. No. 11/267,623, mailed Sep. 25, 2009, 8 pages.

Office Action for Chinese Patent Application No. 200780021083.0 mailed Apr. 1, 2010, 12 pages.

International Search Report and Written Opinion for International Patent Application No. PCT/US2007/013393, mailed Jan. 4, 2008, 13 pages.

Cioffi, et al., "Dynamic Spectrum Management—A methodology for providing significantly higher broadband capacity to the users," Telektronikk, Mar. 2004, 12 pages.

Cioffi, "Dynamic Spectrum Management Report", Committee T1—Telecommunications Working Group NAI, San Francisco, California, Feb. 21, 2005, 75 pages.

Cioffi, et al., "MIMO Channel Measurement Test Plan," Committee T1—Telecommunications, Working Group T1E1.4 (DSL Access), Feb. 17, 2003, 8 pages.

Examination Report for European Patent Application No. 07795837.9, mailed Apr. 1, 2009, 4 pages.

Fang, "Modeling and Characterization of Copper Access Systems," Ph.D. Oral Defense, Electrical Engineering Department, Stanford University, May 31, 2002, 53 pages.

Ginis, et al., "Vectored Transmission for Digital Subscriber Line Systems," IEEE Journal on Selected Areas in Communications, vol. 20 No. 5, Jun. 2002, 20 pages.

Lee, et al., "Binder MIMO Channels," IEEE Journal on Selected Areas in Communications, vol. 55, No. 8, Aug. 2007, 12 pgs.

Magesacher, et al., "Exploiting the Common-Mode Signal in xDSL," European Signal Processing Conference 2004, Vienna, Austria, 4 pages.

International Search Report and Written Opinion of the International Search Authority for International Patent Application No. PCT/IB2005/00482 mailed May 18, 2006, 9 pages.

Paul, "Analysis of Multiconductor Transmission Lines," Wiley Series in Microwave and Optical Engineering, Chapters 2 and 3, (1994), 76 pages.

European Search Report for Application No. 11161331.1 dated May 19, 2011, 6 pages.

Office Action for Japanese Patent Application No. 2009-514370, Mailed Apr. 24, 2012, 3 pages.

* cited by examiner

PHANTOM USE IN DSL SYSTEM

CLAIM OF PRIORITY

This application is a divisional of, and claims priority to, the provisional utility application entitled "PHANTOM USE IN DSL SYSTEM," filed on May 9, 2005, having an application No. 60/678,977; and the non-provisional utility application entitled "PHANTOM USE IN DSL SYSTEM," filed on Nov. 4, 2005, having an application Ser. No. 11/267,623.

TECHNICAL FIELD

This invention relates generally to methods, systems and apparatus for managing digital communications systems.

BRIEF SUMMARY

This invention is a means for superimposing phantom-mode signals to reinforce existing differentially driven DSL downstream signals in a vectored binder of DSLs. Alternative embodiments of the present invention provide phantom-mode diversity reinforcement of upstream vectored signals in a binder of differentially excited twisted pairs. The invention essentially expands the extra transmission modes of the previous GDSL multi-wire two-sided-excitation invention to the case where coordination can only occur on one-side of the binder.

Essentially each pair is treated as a common-mode antenna with respect to earth ground, with some pairs selectively excited at the transformer center tap at the transmit end with respect to a common (earth or chassis) ground reference. Corresponding receivers on other non-excited pairs sense the signals between their center taps and a ground at the opposite ends of the lines to the exciting transmitters. A dual use with hybrid circuits allows the receiving circuit to also have an upstream transmitter and an upstream-sensing receiver on the center tap of the opposite side of an adjacent wire.

In some embodiments of the present invention, a phantom-mode signal communication system has a first communication line configured to operate as a transmission antenna and a second communication line configured to operate as a reception antenna. The phantom-mode signal communication system can be implemented so that the first communication line is a first DSL loop having a center tap at a first end and a center tap at a second end, wherein the first loop first end center tap has an excitation voltage generator coupled thereto and further wherein the first loop second end center tap has an open circuit coupled thereto. The second communication line then can be a second DSL loop having a center tap at a first end and a center tap at a second end, wherein the second loop first end center tap has an open circuit coupled thereto and further wherein the second loop second end center tap has an impedance connecting the second loop second end center tap to ground. Application of the excitation voltage to the first DSL loop first end center tap generates a phantom-mode signal that is broadcast to and received by the second DSL loop impedance.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
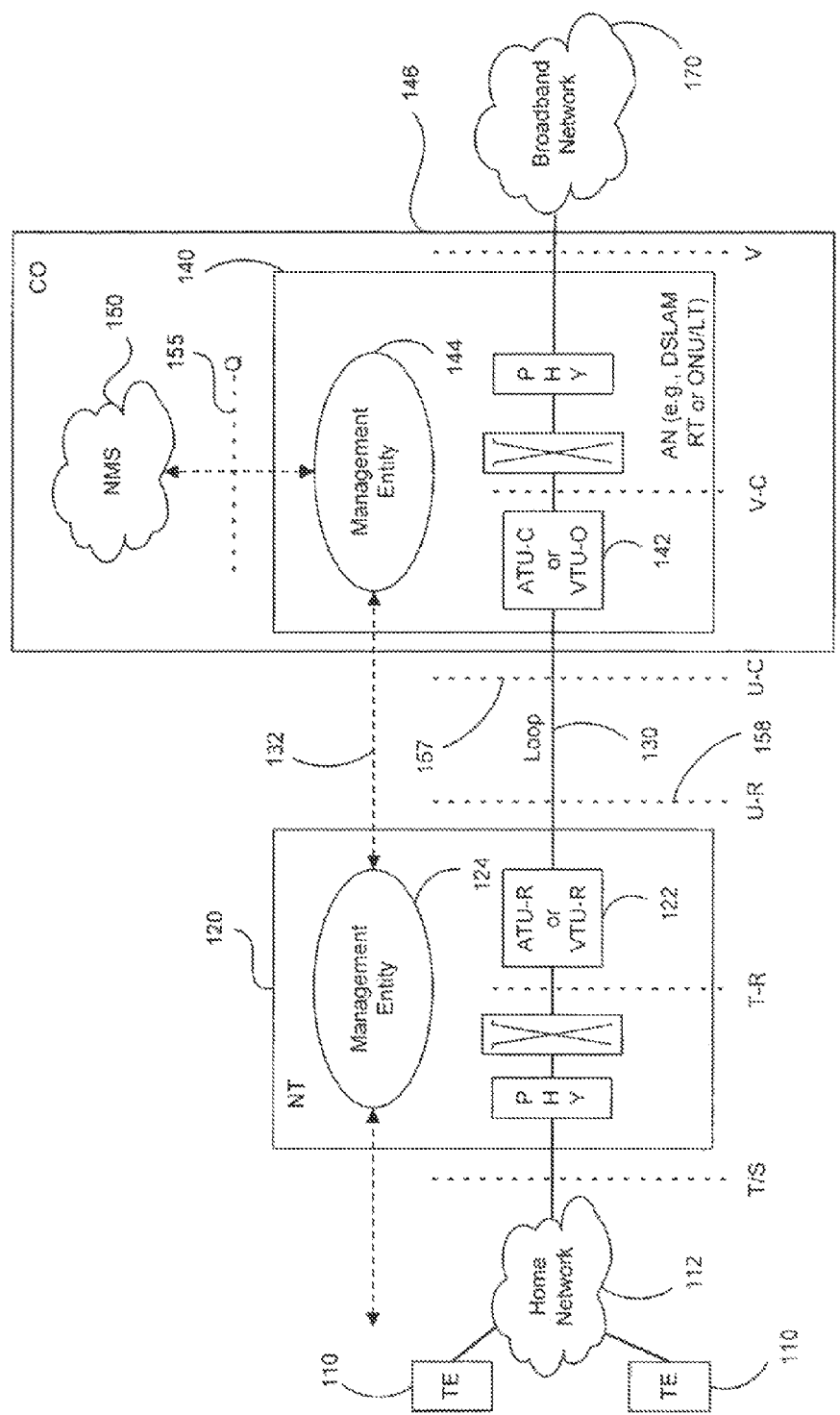
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement use of phantom lines in a communication system to add data transmission capacity and/or to strengthen existing communications. The communication system in which embodiments of the present invention may be used may be an ADSL system, a VDSL system or any other communication system in which the present invention is practical, as will be appreciated by those skilled in the art after reading the present disclosure.

As described in more detail below, a phantom-mode signal control unit implementing one or more embodiments of the present invention can be part of a controller (for example, in or as a DSL optimizer, dynamic spectrum manager or spectrum management center). The controller and/or phantom-mode signal control unit can be located anywhere. In some embodiments, the controller and/or phantom-mode signal control unit reside in a DSL CO. In other cases they may be operated by a third party located outside the CO. Also, they may be operated by the service provider who owns the CO but in a place physically distinct from (and coupled to) the CO. The structure, programming and other specific features of a controller and/or phantom-mode signal control unit usable in connection with embodiments of the present invention will be apparent to those skilled in the art after reviewing the present disclosure.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from the modems. In other cases, the controller may be collocated with one of or both of the modems as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will use vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR-069 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system. NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol" dated May 2004. Finally, DSL Forum Technical Report TR-064, entitled "LAN-Side DSL CPE Configuration Specification" dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-03 1.

It is less common for lines sharing the same binder to terminate on the same line card in ADSL, than it is in VDSL. However, the following discussion of xDSL systems may be extended to ADSL because common termination of same-binder lines might also be done (especially in a newer DSLAM that handles both ADSL and VDSL). In a typical topology of a DSL plant, in which a number of transceiver pairs are operating and/or are available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
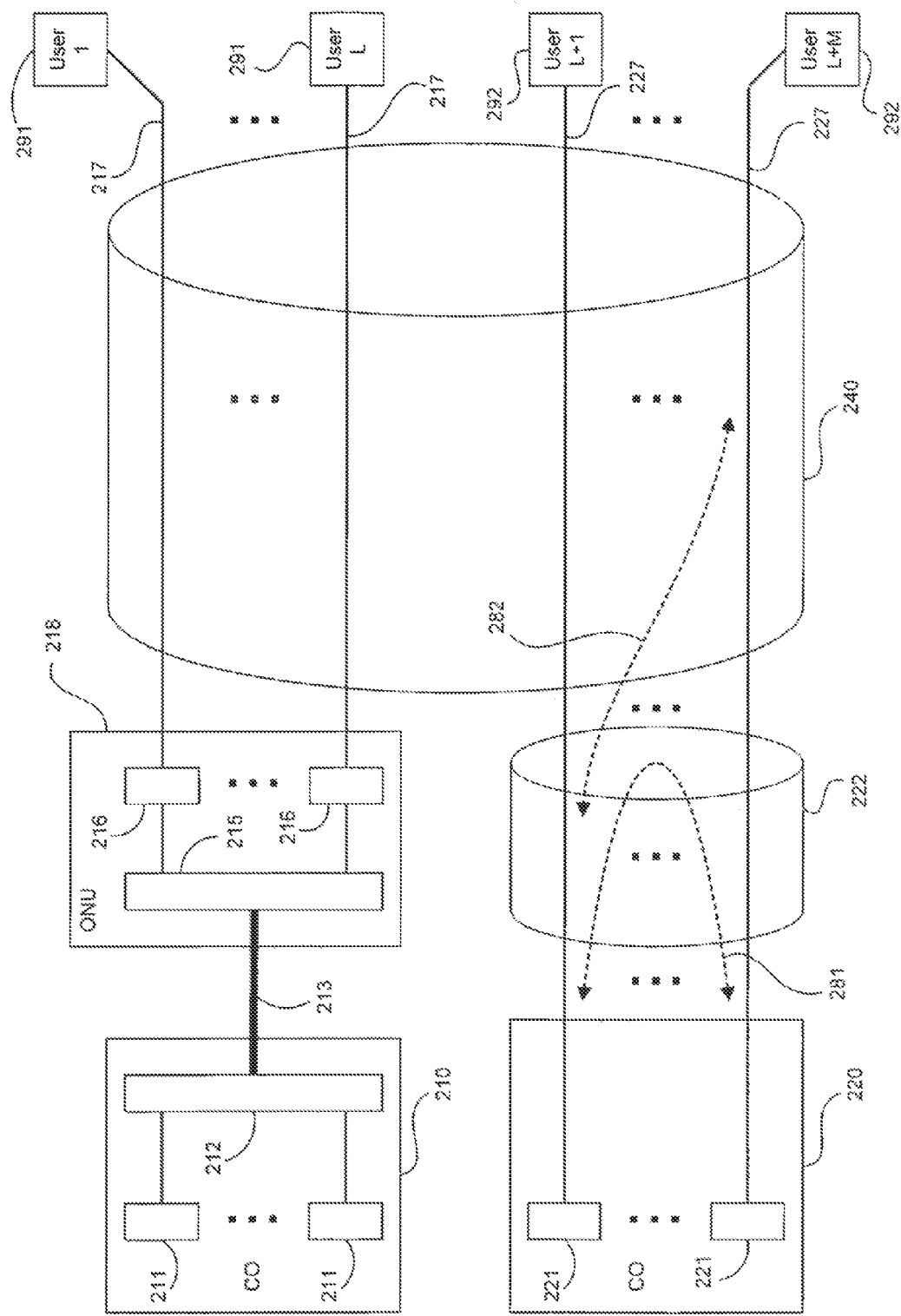
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users and the useful crosstalk-phantom signals used in this invention to increase data rates and/or reliability, occur separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users and the useful crosstalk-phantom signals used in this invention to increase data rates and/or reliability, occur separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

Figure 3A:
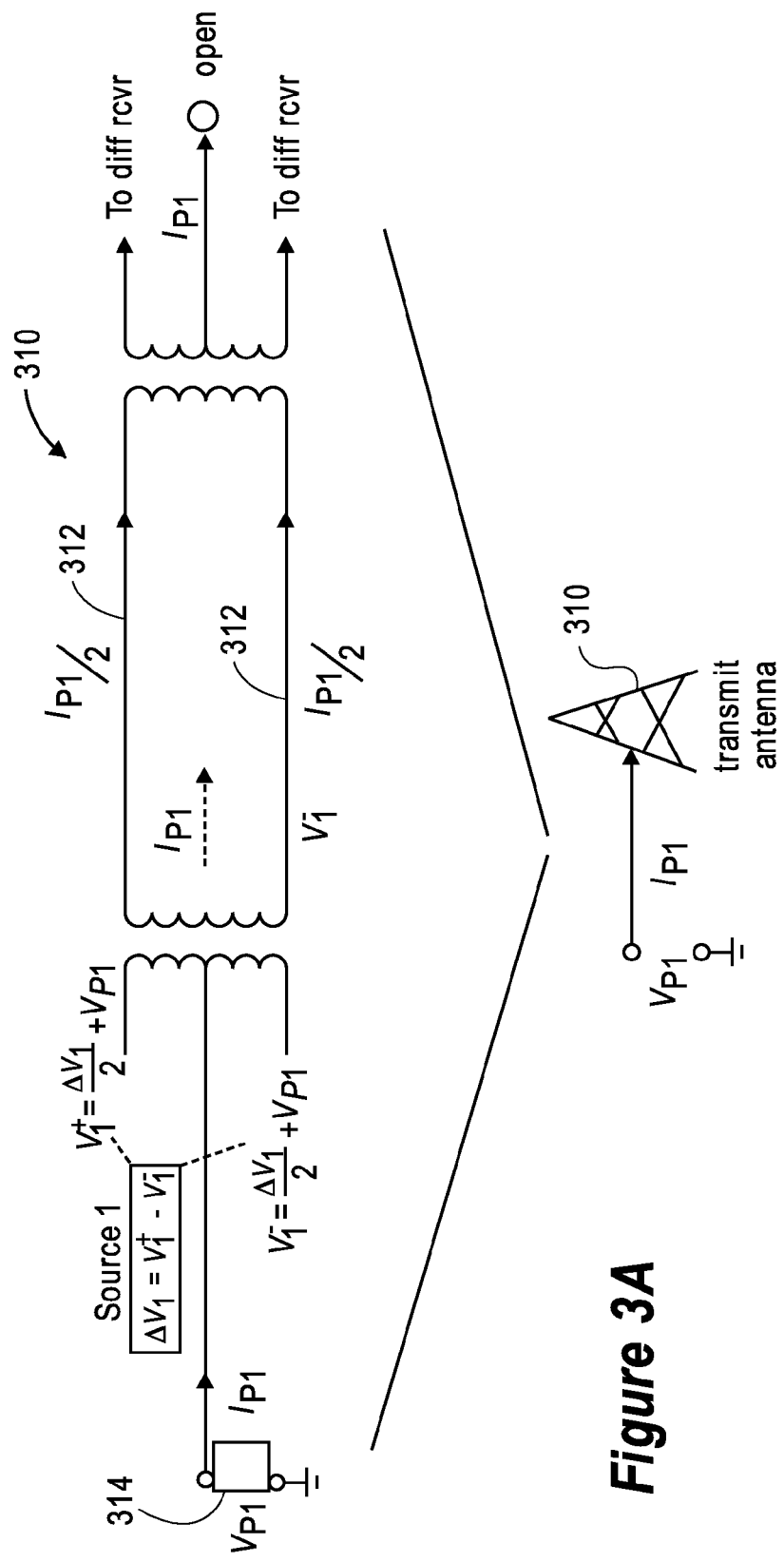
FIG. 3A is a schematic diagram of a transmission antenna according to one embodiment of the present invention.
Figure 3B:
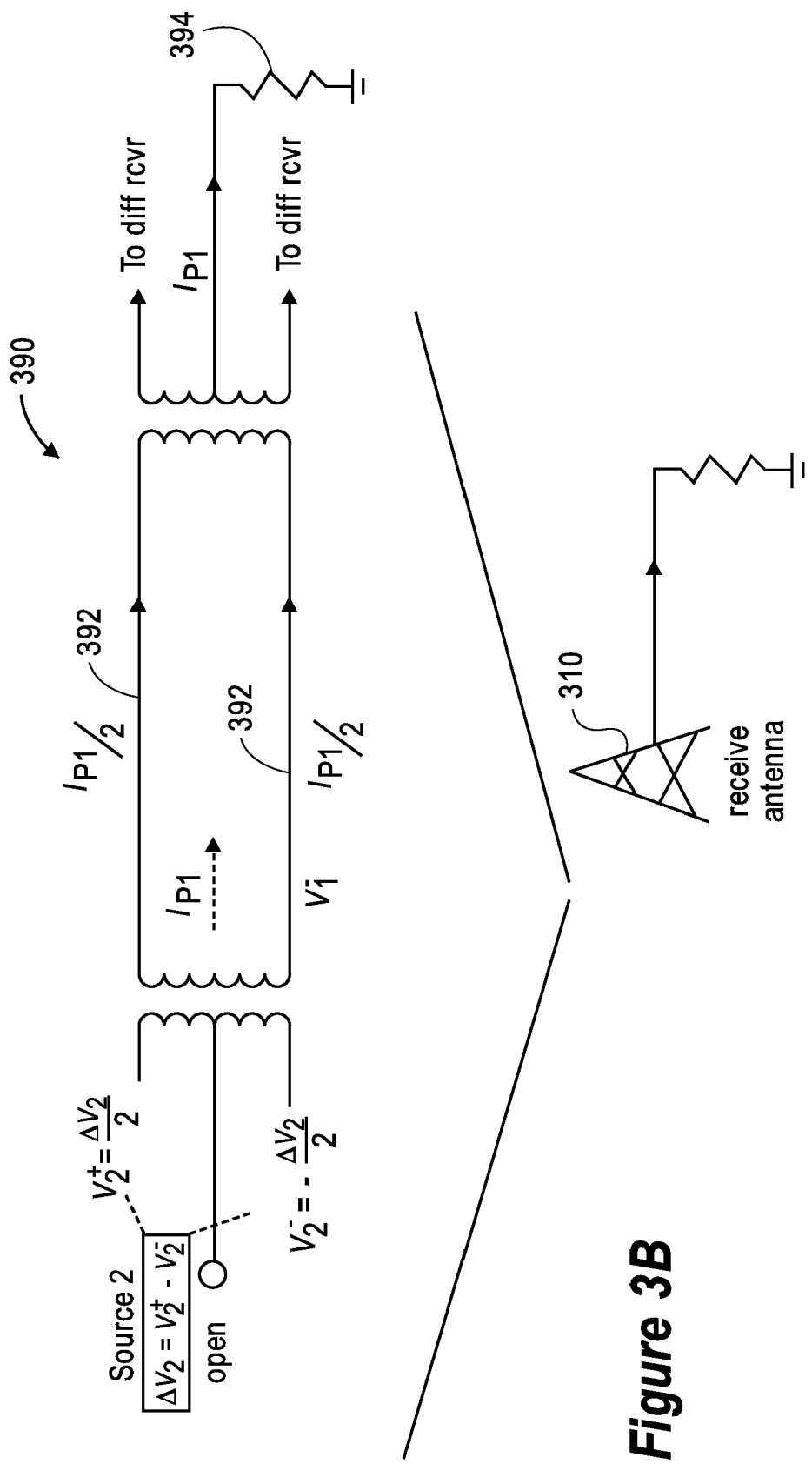
FIG. 3B is a schematic diagram of a reception antenna according to one embodiment of the present invention.

FIG. 3A illustrates the excitation of a downstream phantom mode, viewing this mode in the single-sided case as essentially equivalent to a large long antenna 310. Both wires 312 of the long system carry the phantom component equally, and the two wires 312 could be considered as one (fatter) wire that comprises the antenna 310. FIG. 3B shows the receive antenna 390 made up of wires 392 that are close enough to receive the signals from antenna 310, for example where wires 392 share a binder with wires 312 and presumably are close to the transmit antenna 310 in FIG. 3A.

Figure 3C:
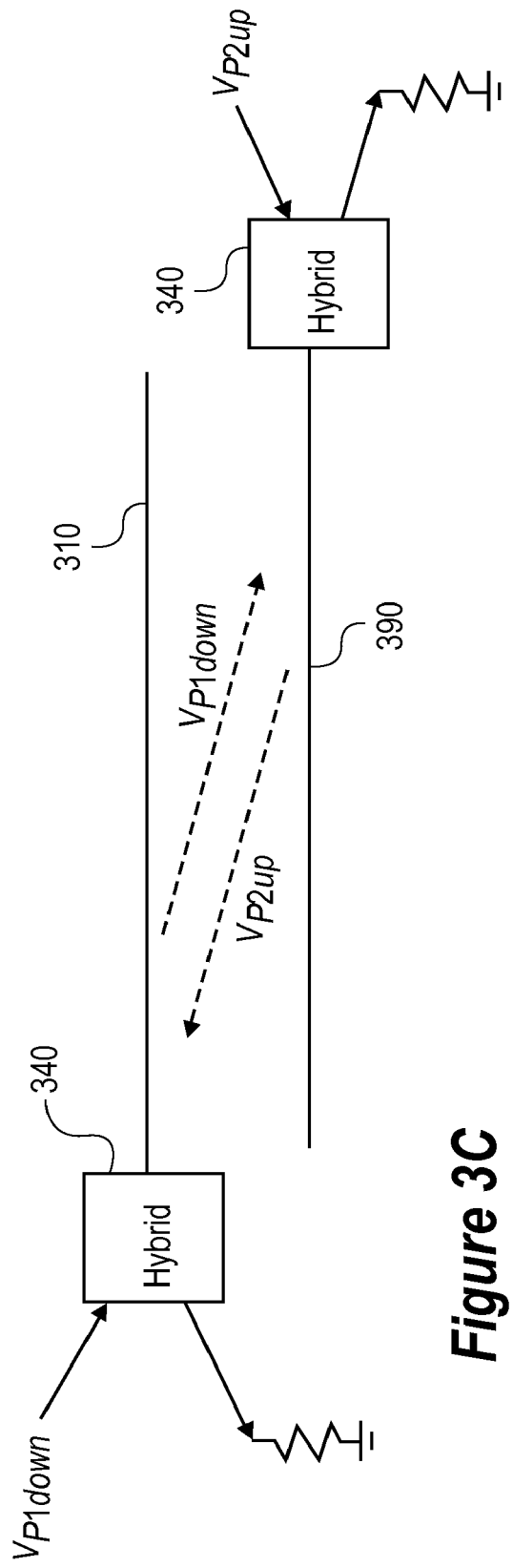
FIG. 3C is a schematic diagram of a transmission pair according to one embodiment of the present invention.

FIG. 3C redraws each pair of wires 312, 392 as one line 310, 390, respectively, and views both transmit and receive lines as antennas. Because it is possible to separate currents in the transmit and receive directions with a "hybrid" circuit 340 (or if not perfect, through the use also of an echo canceller), then the downstream transmit antenna 310 of line 1 also can be viewed as an upstream receive antenna for the phantom signal from the transmit antenna 390 of line 2. (It may not be practical for various reasons to terminate the client/user side of line 1 and try to use it to also receive the downstream phantom signals of line 2 and vice versa). In such cases, the lines can be divided into two groups, those to be used for downstream transmission (and consequently reverse upstream paths' reception) and those for upstream transmission and consequent downstream reception.

Many communication systems (for example, ADSL and VDSL systems) have a matrix channel H that characterizes a multiple-input-multiple output channel. That channel also may be evident in systems using embodiments of this invention. In such a system, there are U coordinated lines. Each of the normal differential transfers, as well as the possible phantom transfers shown in FIGS. 3A-3C, could be measured adaptively. For purposes of this disclosure the "connection-side" of a line is the side of the line on which the hybrid circuit (or any other embodiment of the present invention) is used. Therefore, according to some embodiments of the present invention, no hybrid for phantoms is used on the other side ("non-connection side") of that same line. According to these embodiments, that connection side can be either the LT/CO/DSLAM side or the CPE side, but not both on the same line. Up to $L_{down}$ phantoms may be used for downstream transmissions on the LT connection side, leaving then $U-L_{down}$ phantoms for connection on the CPE side (that is, upstream transmissions), where $L_{down}=1, \ldots, U-1$. It is always possible to change the side that is called the connection side on any line by switching in or out the hybrid circuits correspondingly. Once all transfers are measured a larger 2U×2U matrix can be formed that contains all possible transfers for all of the possible connection-side configurations. The downstream matrix $H_{down}$ might be structured into 4 U×U parts as shown below:

$$H_{down} = \begin{bmatrix} \text{diff} & \text{LTconnect} \\ \text{CPEconnect} & \text{phantomcrosstalk} \end{bmatrix}$$

The "diff" or differential part always exists and corresponds to the normal modes of differentially excited transmission and the corresponding crosstalk. The LT connect columns (the last U columns) correspond to use of the LT as the connection side and so have downstream transmitters at the LT side. In any of these columns, each row entry corresponds to the output from the corresponding phantom input. If this row is in the upper U, then the signal represents crosstalk from a phantom into a differential signal downstream (such crosstalk may be useful or detrimental, depending on how it is used). Such crosstalk will be on the order of the balance of the phone line in terms of its general magnitude (and intermediate in size to main line transfers and FEXT signals for the differential-to-differential lines).

The CPE connect rows (lower U rows) represent systems with the CPE as the connection side and so have downstream receivers at the CPE side. Each row corresponds to one such downstream receiver. The first U entries in each row correspond to crosstalk from differentially excited modes into the phantom receiver corresponding to this row. The last U entries in any row correspond to signals received from phantom excitations. At least one row and one column, but no more than U-1 rows and U-1 columns, need to be eliminated once the connection sides have been determined. This elimination allows a total of U phantoms to be used (either upstream or downstream). The lower right U×U matrix of "phantom crosstalk" has no twisting protection on either the transmit antenna or the receive antenna and so could represent substantial crosstalk terms (depending on line proximities) on the non-diagonal terms. The diagonal terms of this lower right "phantom crosstalk" matrix are all zero because the line cannot transmit in common mode to itself in the architecture of this invention.

Algorithms, such as ordering algorithms invented by Adaptive Spectrum and Signal Alignment, Inc. of Redwood City, Calif., or others, can be used to assign $L_{down}$ lines to downstream transmission or to an LT connect set. Numbering the phantom mode possibilities from $i=1, \ldots, U$, if the $i^{th}$ line is in the CPE connect set, then the $i^{th}$ column in the LT connect set (the last U columns) is deleted, and the $i^{th}$ row in the CPE connect set (last U rows) is kept. Upon completion of this numbering assignment, the matrix $H_{down}$ will be reduced in size to an $(2U-L_{down})\times(U+L_{down})$ matrix. Any other techniques addressing or dealing with an H matrix in DSL and other communication systems typically may be applied to the enlarged H matrix according to the present invention, keeping in mind its unusual dimension properties, as will be appreciated by those skilled in the art.

Similarly there is a matrix $H_{up}$ that also is 2U×2U originally and has a 4-quadrant structure like $H_{down}$, except that the CPE-connect and LT-connect are reversed in position:

$$H_{up} = \begin{bmatrix} \text{diff} & \text{CPEconnect} \\ \text{LTconnect} & \text{phantomcrosstalk} \end{bmatrix}$$

When the $i^{th}$ column of $H_{down}$ is eliminated, then the $i^{th}$ row of $H_{up}$ is correspondingly eliminated. Similarly when the $i^{th}$ row of $H_{down}$ is kept, then the $i^{th}$ column of $H_{up}$ is correspondingly kept. The result will be a reduced-size $H_{up}$ that is a $(U+L_{down})\times(2U-L_{down})$ matrix. Any other techniques addressing or dealing with an H matrix in DSL and other communication systems typically may be applied to the enlarged H matrix according to the present invention, keeping in mind its unusual dimension properties, as will be appreciated by those skilled in the art. Any treatment, manipulation, use, etc. of channel matrices applicable to systems such as those with which the present invention can be used may then be applied to the $H_{down}$ and $H_{up}$ identified above. Similarly, as will be appreciated by those skilled in the art, some of these matrices may be allocated as necessary to downstream or upstream channels to exploit phantom capacity as best as possible.

Some embodiments of this invention recognize that grounding some of the used lines in the binder to earth ground will cause larger crosstalk modes between the remaining antenna. This effectively corresponds to placing 0 voltage on the center tap of the exciting connect side transformer (even if no differential is used)—the transformer output-side winding is best used in this case for the ground. It may be possible to excite a line on the output transformer side for all phantom voltages (and to receive on that line side at the CPE connect locations), but this may create an isolation/safety hazard in practice when not a ground. Grounding of lines will be appreciated by one skilled in the art as possibly improving the antenna transfer properties of the other phantom modes.

Also, embodiments of the present invention can operate bi-directionally so that inter-pair phantom transfers used for downstream can be separated using a-phantom hybrid circuit for upstream reception across those same lines. A phantom hybrid circuit would be similar in basic structure to hybrid circuits well known to those skilled in the art and used for separation of downstream and upstream signals on differential connections. However, the phantom hybrid would instead connect between the center tap and the selected ground for the phantom source (downstream) and load (upstream) at the VTU-O (or ATU-C) side. Similarly the phantom hybrid would connect between the center tap and the selected ground for the phantom source (upstream) and load (downstream) at the VTU-R (or ATU-R) side (on another line).

Figure 4A:
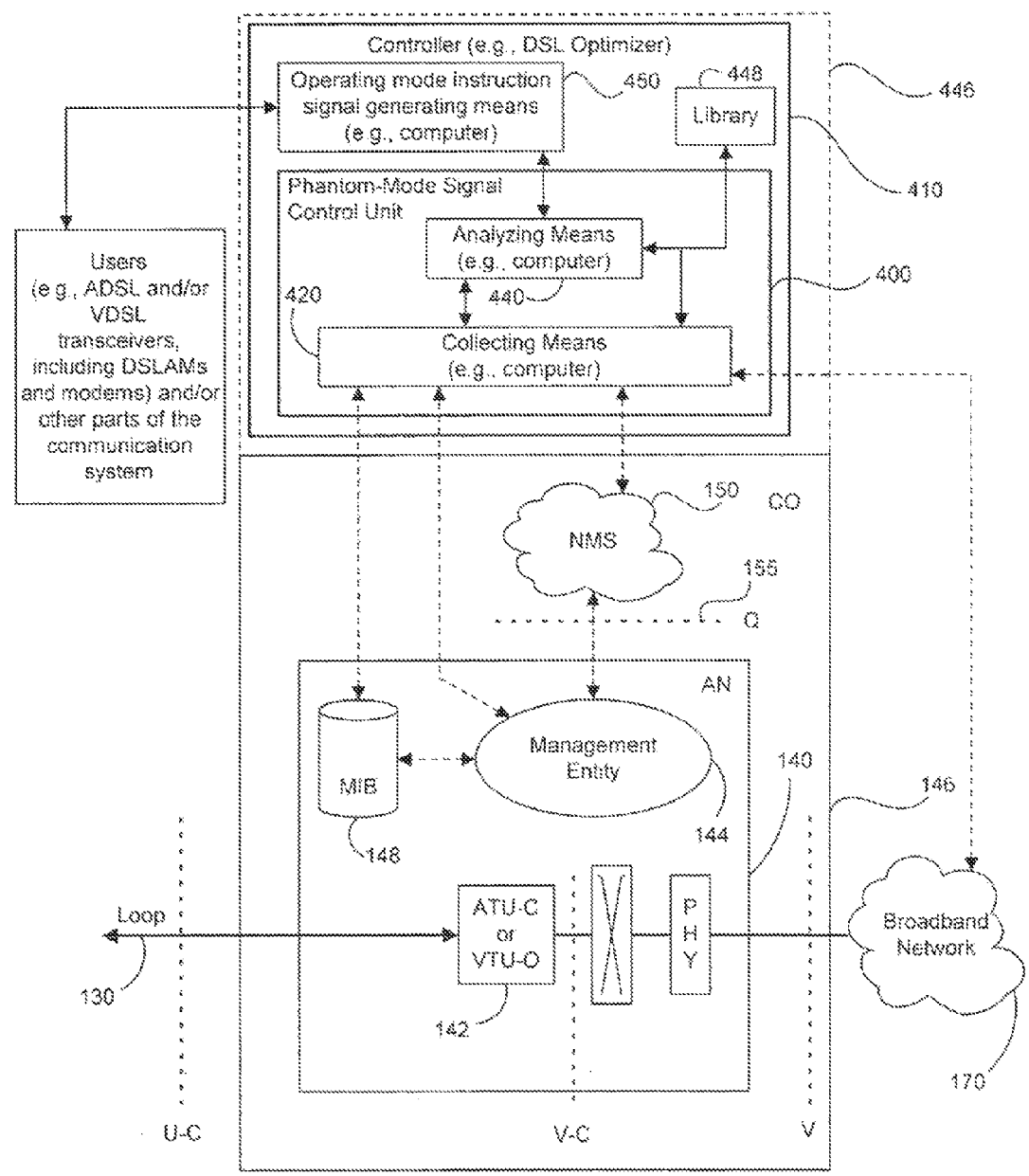
FIG. 4A is a controller including a phantom-mode signal control unit according to one embodiment of the present invention.

According to one embodiment of the present invention shown in FIG. 4A, a phantom-mode signal control unit 400 may be part of an independent entity coupled to a DSL system, such as a controller 410 (for example, a device functioning as or with a DSL optimizer, DSM server, DSM Center or a dynamic spectrum manager) assisting users and/or one or more system operators or providers in operating and, perhaps, optimizing use of the system. (A DSL optimizer may also be referred to as a dynamic spectrum manager, Dynamic Spectrum Management Center, DSM Center, System Maintenance Center or SMC.) In some embodiments, the controller 410 may be an ILEC or CLEC operating a number of DSL lines from a CO or other location. As seen from the dashed line 446 in FIG. 4A, the controller 410 may be in the CO 146 or may be external and independent of CO 146 and any company operating within the system. Moreover, controller 410 may be coupled to and/or controlling DSL and/or other communication lines in multiple COs.

The phantom-mode signal control unit 400 includes a data collection unit identified as a collecting means 420 and an analysis unit identified as analyzing means 440. As seen in FIG. 4A, the collecting means 420 may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the phantom-mode signal control unit to collect operational data from the system. Data may be collected once or over time. In some cases, the collecting means 420 will collect on a periodic basis, though it also can collect data on-demand or on any other non-periodic basis (for example, when a DSLAM or other component sends data to the state transition control unit), thus allowing the phantom-mode signal control unit 400 to update its information, operation, etc., if desired. Data collected by means 420 is provided to the analyzing means 440 for analysis and any decision regarding operation of one or more communication lines being used to transmit data using phantom-mode signals.

In the exemplary system of FIG. 4A, the analyzing means 440 is coupled to a DSLAM, modem and/or system operating signal generating means 450 in the controller 410. This signal generator 450 (for example, a computer, processor, IC or system or component of such a device) is configured to generate and send instruction signals to modems and/or other components of the communication system (for example, ADSL and/or VDSL transceivers and/or other equipment, components, etc. in the system). Instructions may include assignment of loops to upstream or downstream transmission or reception status, hybrid device operation or other instructions regarding acceptable data rates, transmit power levels, coding and latency requirements, etc. The instructions may be generated after the controller 410 determines the availability and suitability of phantom-mode signal operation on one or more loops in the communication system.

Embodiments of the present invention can utilize a database, library or other collection of data pertaining to the data collected, past operation using phantom-mode signals, etc. This collection of reference data may be stored, for example, as a library 448 in the controller 410 of FIG. 4A and used by the analyzing means 440 and/or collecting means 420. In some embodiments of the present invention, the phantom-mode signal control unit 400 may be implemented in one or more computers such as PCs, workstations or the like. The collecting means 420 and analyzing means 440 may be software modules, hardware modules (for example, one or more computers, processors, ICs, etc. or a system or component based on such a device) or a combination of both, as will be appreciated by those skilled in the art. When working with a large numbers of modems, databases may be introduced and used to manage the volume of data collected.

Figure 4B:
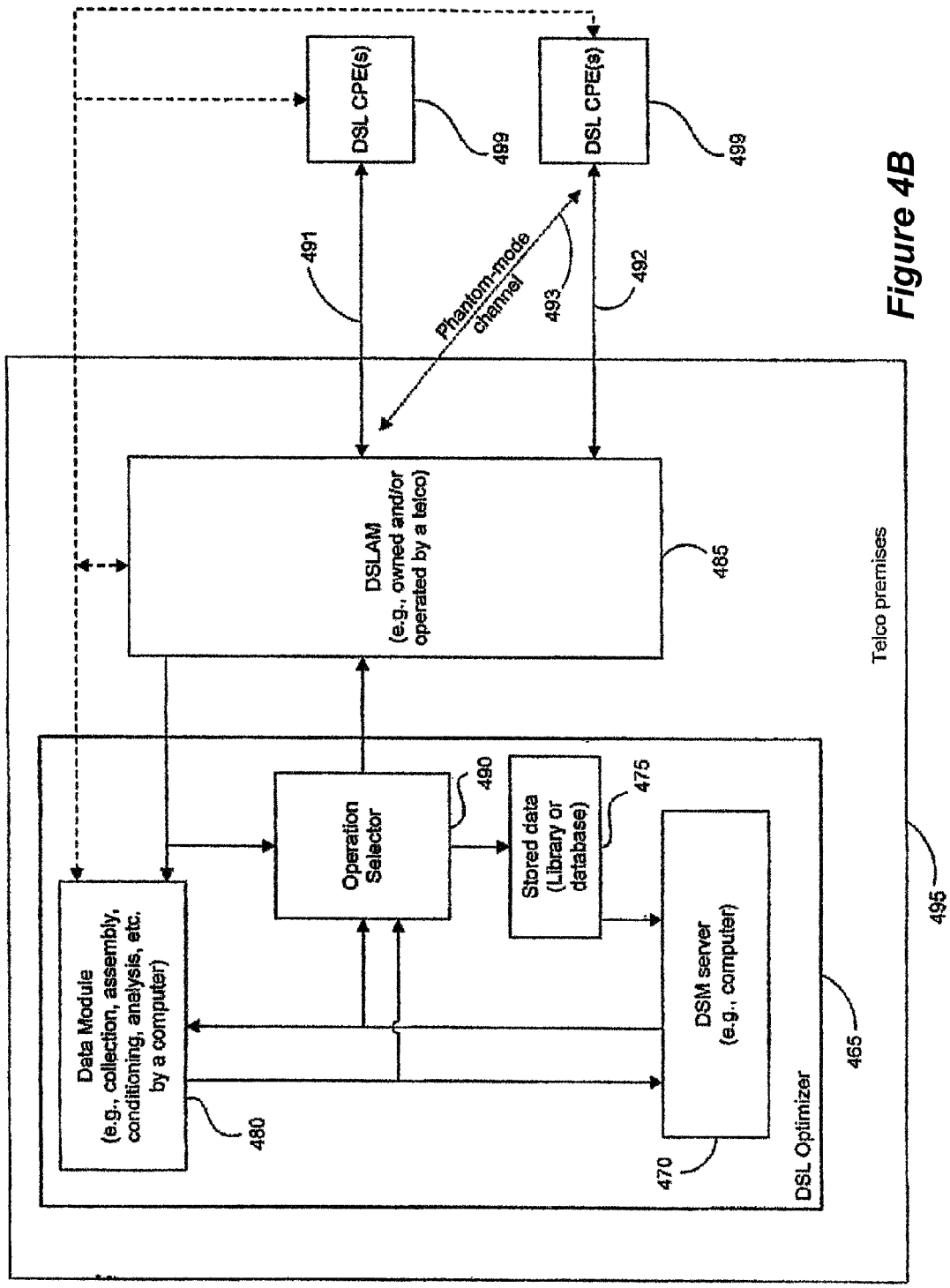
FIG. 4B is the DSL optimizer according to one embodiment of the present invention.

Another embodiment of the present invention is shown in FIG. 4B. A DSL optimizer 465 operates on and/or in connection with a DSLAM 485 or other DSL system component, either or both of which may be on the premises 495 of a telecommunication company (a "telco"). The DSL optimizer 465 includes a data module 480, which can collect, assemble, condition, manipulate and supply operational data for and to the DSL optimizer 465. Module 480 can be implemented in one or more computers such as PCs or the like. Data from module 480 is supplied to a DSM server module 470 for analysis (for example, determining the availability of phantom-mode signal operation for given pairs of communication lines, modification of existing phantom-mode signal operation, etc.). Information also may be available from a library or database 475 that may be related or unrelated to the telco.

An operation selector 490 may be used to implement, modify and/or cease phantom-mode signal operation. Such decisions may be made by the DSM server 470 or by any other suitable manner, as will be appreciated by those skilled in the art. Operational modes selected by selector 490 are implemented in the DSLAM 485 and/or any other appropriate DSL system component equipment. Such equipment may be coupled to DSL equipment such as customer premises equipment 499. In the case of phantom-mode signal operation, the DSLAM 485 can be used to implement phantom-mode signal operation between lines 491, 492, thus creating a phantom-mode signal channel 493 between lines 491, 492 in either an upstream or downstream direction. The system of FIG. 4B can operate in ways analogous to the system of FIG. 4A, as will be appreciated by those skilled in the art, though differences are achievable while still implementing embodiments of the present invention.

Figure 5:
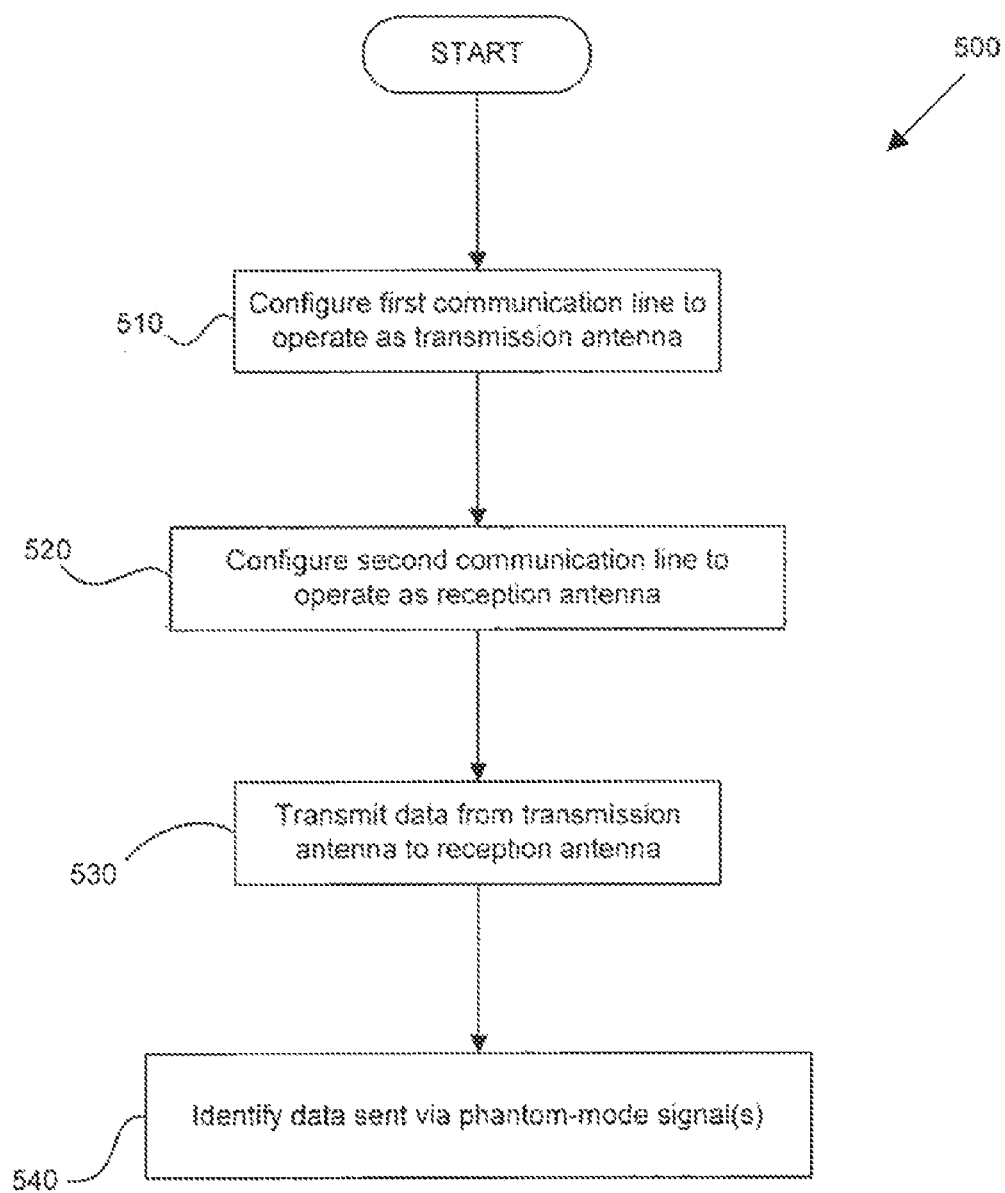
FIG. 5 is a flow diagram of a method according to one embodiment of the present invention.

A method 500 according to one or more embodiments of the present invention is shown in FIG. 5. At 510 a first communication line is configured to operate as a transmission antenna, for example by using the apparatus and/or techniques illustrated in FIGS. 3A-3C. At 520 a second communication line is likewise configured to operate as a reception antenna, again possibly implementing apparatus and/or techniques illustrated in FIGS. 3A-3C. Data is then transmitted on the first line's transmission antenna at 530 and is broadcast to the second communication line. At 540 the receiving device on the second communication line, or any other apparatus and/or equipment used to assist in the operation of the second line, identifies the phantom-mode signal data, for example using techniques described above. In some embodiments, the two communication lines can be DSL loops in a common binder. These DSL loops may be operated in a one-sided or two-sided vectored system.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In-particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
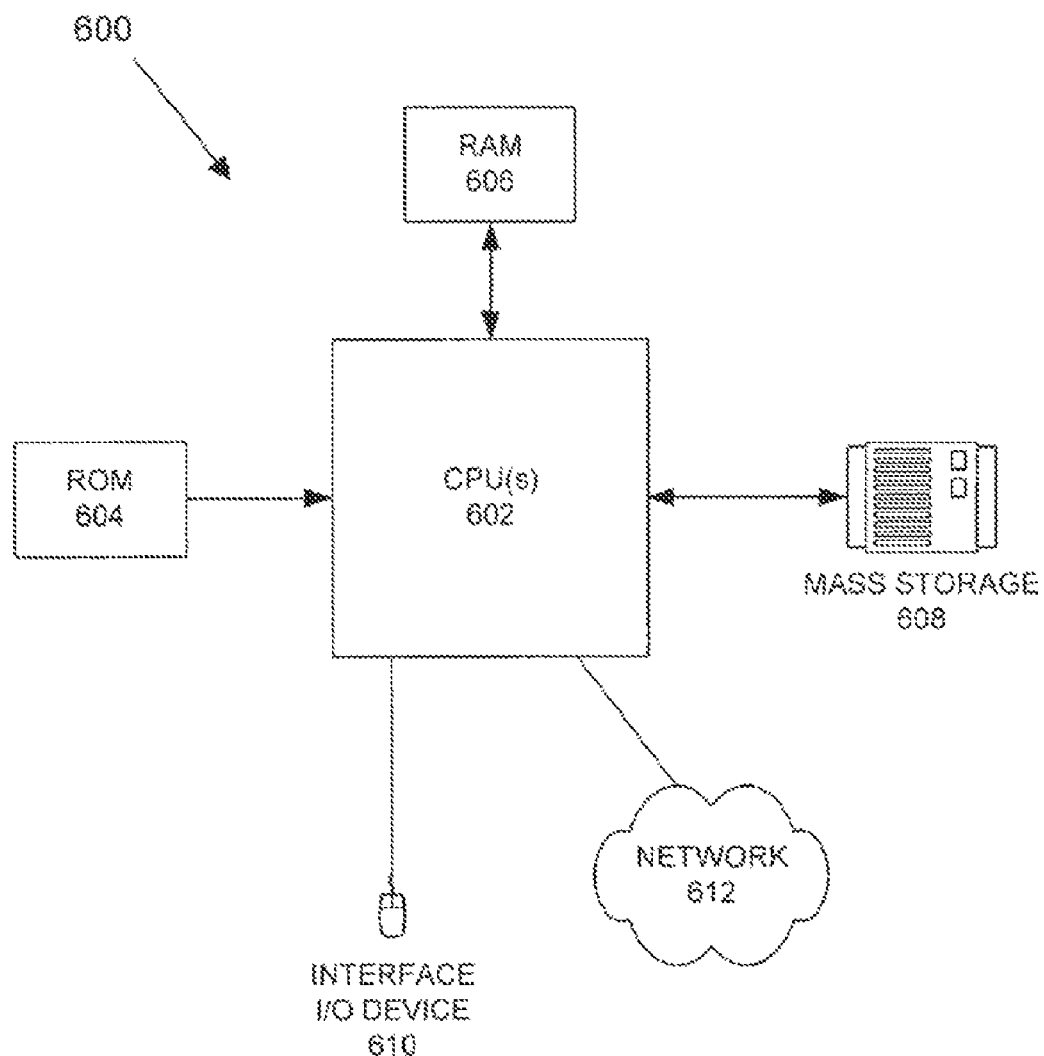
FIG. 6 is a block diagram of a typical computer system or integrated circuit system suitable for implementing embodiments of the present invention.

FIG. 6 illustrates a typical computer system that can be used by a user and/or controller in accordance with one or more embodiments of the present invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). As is well known in the art, primary storage 604 acts to transfer data and instructions uni-directionally to the CPU and primary storage 606 is used typically to transfer data and instructions in a bi-directional manner. Both of these primary storage devices may include any suitable of the computer-readable media described above. A mass storage device 608 also is coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 also is coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 608 or 614 and executed on CPU 602 in conjunction with primary memory 606. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A Digital Subscriber Line (DSL) communication system comprising:
  a first DSL loop and a second DSL loop each having a transformer center tap at one end;

an excitation voltage generator for each of the first and second DSL loops, the excitation voltage generators to connect the transformer center taps of the first and second DSL loops to a common ground;

a third DSL loop and a fourth DSL loop each having a transformer center tap at one end;

a load impedance for each of the third and fourth DSL loops, the load impedances to connect the transformer center taps of the third and fourth DSL loops to the common ground; and wherein data signals created by the excitation voltage generators transmitted on the first and the second DSL loops generate data signals on the third and forth DSL loops which are applied to the load impedances.

2. The DSL communication system of claim 1, wherein the first, second, third, and fourth DSL loops operate within a vectored DSL communication system.

3. The DSL communication system of claim 2, wherein the vectored DSL communication system comprises the first, second, third, and fourth DSL loops within a vectored binder of DSL loops, and wherein the vectored DSL communication system to superimpose phantom-mode signals onto the first, second, third, and fourth DSL loops within the vectored binder of DSL loops to expand extra transmission modes.

4. The DSL communication system of claim 2:
wherein the vectored DSL communication system comprises the first and second DSL loops designated as a first pair and the third and fourth DSL loops designated as a second pair, and wherein each pair is treated as a common-mode antenna with respect to earth ground via the common ground; and
wherein the excitation voltage generators to selectively excite signals at the first pair via the transformer center taps at the one end of each respective DSL loop in the first pair, wherein the one end of each respective DSL loop in the first pair comprises a transmit end with respect to the common ground.

5. The DSL communication system of claim 4, further comprising:
a corresponding receiver on the non-excited second pair to sense the signals between their transformer center taps and the common ground at the opposite ends of each respective DSL loop in the second pair.

6. The DSL communication system of claim 1, wherein the first DSL loop and the second DSL loop are controlled by at least one of the following:
a controlling computer;
a controller; and
a DSL optimizer.

7. The DSL communication system of claim 1, further comprising:
a transformer center tap at a second end of the first DSL loop coupled to a first open circuit;
a transformer center tap at a second end of the second DSL loop coupled to a second open circuit;
a transformer center tap at a second end of the third DSL loop coupled to a third open circuit; and
a transformer center tap at a second end of the fourth DSL loop coupled to a fourth open circuit.

8. The DSL communication system of claim 7:
wherein the first DSL loop first end is an upstream end of the first DSL loop, wherein the second DSL loop first end is an upstream end of the second DSL loop, wherein the third DSL loop first end is an upstream end of the third DSL loop, and wherein the fourth DSL loop first end is an upstream end of the fourth DSL loop; and further wherein the first DSL loop first end is a downstream end of the first DSL loop, wherein the second DSL loop first end is a downstream end of the second DSL loop, wherein the third DSL loop first end is a downstream end of the third DSL loop, and wherein the fourth DSL loop first end is a downstream end of the fourth DSL loop.

9. The DSL communication system of claim 7:
wherein the first DSL loop and the second DSL loop each further comprise a hybrid circuit at the first end of each respective loop;
wherein the third DSL loop and the fourth DSL loop each further comprises a hybrid circuit at the second end of each respective loop; and
further wherein the first, second, third, and fourth DSL loops are configured to operate bi-directionally sending phantom-mode signals that expand extra transmission modes of the DSL communication system.

10. A method comprising:
transmitting data signals on a first DSL loop and a second DSL loop each having a transformer center tap at one end, each of the first and second DSL loops coupled with an excitation voltage generator via the transformer center tap of each of the first DSL loop and the second DSL loop, wherein each of the excitation voltage generators connects the transformer center taps of the first and second DSL loops to a common ground;
applying, via the excitation voltage generators, an excitation voltage to each of the first and second DSL loops;
receiving the data signals on a third DSL loop and a fourth DSL loop through the common ground, the third and fourth DSL loops each having a transformer center tap at one end and each connected to the common ground via a load impedance connecting the transformer center tap at the one end of each of the third DSL loop and the fourth DSL loop to the common ground; and
applying, via the load impedances, the excitation voltage to the data signal received on the third DSL loop and the fourth DSL loop.

11. The method of claim 10, wherein the excitation voltage applied to each of the first and second DSL loops generates the data signals received on the third and fourth DSL loops.

12. The method of claim 10, wherein the method is performed within a vectored DSL communication system; and
wherein the method further comprises applying vectoring to the first, second, third, and fourth DSL loops within the vectored DSL communication system.

13. The method of claim 10:
wherein the first, second, third, and fourth DSL loops exist within a vectored binder of DSL loops; and
wherein applying the excitation voltage to each of the first and second DSL loops comprises superimposing signals onto the first, second, third, and fourth DSL loops within the vectored binder of DSL loops to expand extra transmission modes.

14. The method of claim 13:
designating the first and second DSL loops as a first pair and the third and fourth DSL loops as a second pair;
treating each pair as a common-mode antenna with respect to earth ground via the common ground; and
selectively exciting signals, via the excitation voltage generators coupled with the first pair, at each DSL loop in the first pair via the transformer center taps of the first pair.

15. The method of claim 14:
sensing, via a corresponding receiver coupled with the non-excited second pair, signals resulting from selectively exciting the first pair, the signals sensed on the non-excited second pair between the transformer center taps of the non-excited second pair and the common ground at the opposite ends of each respective DSL loop in the non-excited second pair.

16. The method of claim 10, wherein the first, second, third, and fourth DSL loops are each controlled by a controller.

17. A controller having a data module for collecting operational data from a Digital Subscriber Line (DSL) communication system comprising:
    a first DSL loop and a second DSL loop each having a transformer center tap at one end;
    an excitation voltage generator for each of the first and second DSL loops, the excitation voltage generators to connect the transformer center taps of the first and second DSL loops to a common ground;
    a third DSL loop and a fourth DSL loop each having a transformer center tap at one end;
    a load impedance for each of the third and fourth DSL loops, the load impedances to connect the transformer center taps of the third and fourth DSL loops to the common ground;
    a Dynamic Spectrum Manager (DSM) server communicatively interfaced with the data module, wherein the DSM server to analyze the operational data collected from the DSL communication system; and
    an instruction generator to instruct the first and second DSL loops and the third and fourth DSL loops to transmit data signals between the first and second DSL loops and the third and fourth DSL loops.

18. The controller of claim 17, wherein the controller comprises a DSL optimizer.

19. The controller of claim 17, wherein the controller further comprises:
    means for collecting the operational data from the DSL communication system;
    means for analyzing the operational data collected by the collecting means; and
    wherein the instruction generator comprises means for generating instructions to control the first, second, third, and fourth DSL loops, wherein the means for generating instructions are to assist the first and second DSL loops in transmitting data as a data signal, and further wherein the generated instructions are to assist the third and fourth DSL loops in receiving the transmitted data as the data signal.

20. The controller of claim 17, wherein the generated instructions comprise at least instructions causing the excitation voltage generators coupled with the first and second DSL loops to apply an excitation voltage to the first and second DSL loops.

* * * * *